United States Patent [19]
Brotz

[11] Patent Number: 5,663,740
[45] Date of Patent: Sep. 2, 1997

[54] DISPLAY DEVICE PRODUCING A THREE-DIMENSIONAL REAL IMAGE

[76] Inventor: Gregory R. Brotz, P.O. Box 1322, Sheboygan, Wis. 53081

[21] Appl. No.: 416,175

[22] Filed: Apr. 4, 1995

Related U.S. Application Data

[63] Continuation-in-part of Ser. No. 184,973, Jan. 21, 1994, abandoned, which is a continuation-in-part of Ser. No. 866,988, Apr. 10, 1992, abandoned, which is a continuation-in-part of Ser. No. 786,564, Nov. 1, 1991, abandoned, which is a continuation-in-part of Ser. No. 454,389, Dec. 21, 1989, Pat. No. 5,072,215, which is a continuation-in-part of Ser. No. 182,920, Apr. 18, 1988, Pat. No. 4,896,150.

[51] Int. Cl.$^6$ ....................................................... G09G 3/20
[52] U.S. Cl. ............................................................ 345/31
[58] Field of Search ........................... 345/6, 31, 139; 342/180; 348/51

[56] References Cited

U.S. PATENT DOCUMENTS

| | | | |
|---|---|---|---|
| 3,138,796 | 6/1964 | Withey | 342/180 |
| 3,154,636 | 10/1964 | Schwertz . | |
| 4,160,973 | 7/1979 | Berlin, Jr. . | |

*Primary Examiner*—Jeffery Brier
*Attorney, Agent, or Firm*—William Nitkin

[57] ABSTRACT

A display device for producing a three-dimensional real image having a viewing chamber with a front, a back and a depth with a movable screen disposed within the chamber with the screen facing the front of the viewing chamber. Light-producing elements create an image on the movable screen with structure to rapidly move the screen within the chamber. Also disclosed is an embodiment utilizing a rotating spiral screen.

9 Claims, 5 Drawing Sheets

DISPLAY DEVICE PRODUCING A THREE-DIMENSIONAL REAL IMAGE

This application is a continuation-in-part of my previous application for Display Producing a Three-dimensional Effect, Ser. No. 08/184,973 filed Jan. 21, 1994, now abandoned, which was a continuation-in-part of my previous application under the same title, application Ser. No. 07/866,988 filed Apr. 10, 1992, now abandoned, which was a continuation-in-part of my previous application for Three-dimensional Imaging System, Ser. No. 786,564 filed Nov. 1, 1991 now abandoned which was a continuation-in-part of my previous application entitled Three-dimensional Imaging System, Ser. No. 454,389 filed Dec. 21, 1989 now U.S. Pat. No. 5,072,215 which was a continuation-in-part of my previous application under the same title having Ser. No. 182,920 filed Apr. 18, 1988 now U.S. Pat. No. 4,896,150.

BACKGROUND OF THE INVENTION

1. Field of the Invention

The device of this invention resides in the area of visual displays and more particularly relates to a device producing a visual three-dimensional impression and/or real image directly observable by a viewer without the use of 3-D viewers or 3-D glasses.

2. Description of the Prior Art

Many devices yielding a three-dimensional-like image such as a hologram or 3-D viewers are known in the art. Some of these devices require two images which are observed by the viewer through a stereo viewer which recomposes the two images into an apparent three-dimensional image. The Applicant in U.S. Pat. Nos. 4,896,150 and 5,072,215 has disclosed three-dimensional viewing chambers.

Three-dimensional display devices incorporating rotating flat screens are found in the art, being described in the Schwertz U.S. Pat. No. 3,154,636 and in the Berlin U.S. Pat. No. 4,160,973 which devices utilize a planar screen which rotates around an axis being attached to an edge of the screen. These devices use LEDs or discrete electroluminescing areas to make the rotating planar screen generate a two-dimensional image that changes according to its position during rotation. A drawback to such devices is that from any vantage point a dark line forms down the center of the image produced due to the thickness of the screen at a point during its rotation when it is directly facing the viewer. Also, complex electronics are required to compensate for the virtual narrowing and widening of the screen and the related change in perspective as the screen sweeps from its position when its edge is facing the viewer to a position 90 degrees therefrom when the surface of the screen plane is facing the viewer.

SUMMARY OF THE INVENTION

The device of this invention utilizes a screen disposed in a viewing chamber which screen moves in such viewing chamber so that portions of the screen at points in time occupy every point of the display volume of the viewing chamber. When display information is provided to the screen for areas of the screen to be illuminated, the movement of the screen through space produces the impression to an observer that the image has depth or a three-dimensional quality. This effect in one embodiment of the device of this invention is accomplished by moving a flat screen linearly oscillating back and forth in the chamber with the screen having image-producing means thereon which in one embodiment can be a plurality of light-emitting elements on the front surface thereon, each independently activated as directed by a video program to produce an image.

In another embodiment of the display device of this invention a rotating spiral screen can be utilized having image-producing means such as a plurality of independently controlled light-producing elements disposed on its forward-facing surface. The spiral screen continuously rotates along its vertical axis or shaft in the viewing chamber at a fast rate of rotation, and positions on the screen surface eventually pass all points in the display volume during each rotation. Such rotational movement produces a three-dimensional effect to an image formed on the spiral screen as it is viewed from the front of the viewing chamber.

DESCRIPTION OF THE PREFERRED EMBODIMENT(S)

Figure 1:
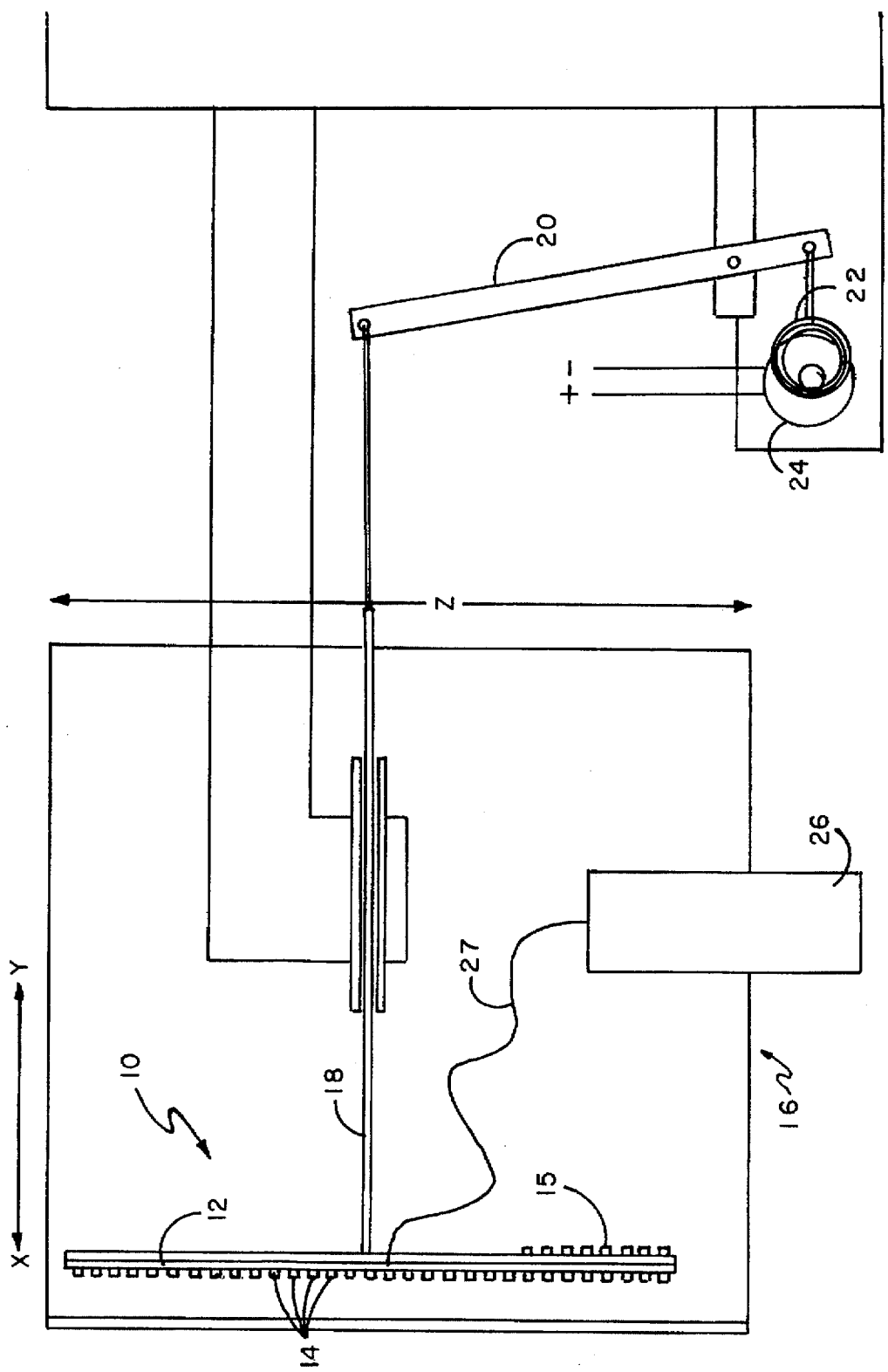
FIG. 1 illustrates a side view of one embodiment of the display device of this invention showing a flat planar sceen and mechanical means to move it rapidly back and forth along the length of the viewing chamber.

FIG. 1 illustrates display screen 10 having on its upper surface 12 visible image-producing means (IPMs) such as, for example, an FED (Field Emission Display) or in another example a plurality of independently controlled light-emitting diodes (LEDs), each forming illuminated and non-illuminated spots to produce an image. An FED has been compared to a miniature cathode ray tube disposed between two plates. In an FED each pixel can have a plurality of emitter cones formed on a lower plate, each with an emitting microtip. A transparent phosphor-coated upper face plate is positioned over the array of cones. In some cones picture resolution can be improved by the use of a focus grid to collimate the electrons drawn off the microtips. Like a conventional cathode ray tube electrons are liberated from the microtips acting as the cathode and impinge on the phosphors of the transparent face plate to produce an illuminated spot. Unlike conventional cathode ray tubes where an electron gun is disposed a distance from the screen, requiring a high vacuum to aid in passage of the electrons, FEDs with their extremely short electron travel distance can be made of much thinner materials and require a very low anode voltage. FEDs are an improvement over other types of flat panel displays in that the viewing angle is greatly increased. Thus the use in this invention of FEDs allows for a real image to be formed on the moving surface, pixel by pixel, with each pixel producing its own light by its activated phosphors. When using FEDs even color displays are possible. Solid state display screens are also known which provide about 150,000 picture elements being LEDs on a large printed circuit to compose a pictorial image such as a television image. Each LED represents one picture element or pixel.

In some embodiments back surface 15 of screen 10 can have the same IPMs thereon as disposed on front surface 12. Screen 10 is moved back and forth within viewing chamber 16, as described in detail below, moving from a first static stage or phase at the top and bottom of its movement range through an acceleration stage to a constant velocity stage and through a deceleration stage to its second static stage whence its direction of movement changes and the stages repeat themselves. It is desirable that the screen move at substantially the same velocity through as much of its range of movement as possible. The use of a self-reversing screw is most advantageous to minimize the deceleration and acceleration phases of the screen motion in that as soon as the screw follower bottoms out and catches the reverse lead on the screw, the screen which is attached by a shaft to the screw follower is again moving at a constant velocity until it reaches the top of its stroke where it reverses again. The activation of the IPMs can utilize electronically controlled timing sequence means to gate the video information to the screen only during its most constant velocity stage or phase of movement. The screen of this invention can be either horizontally or vertically disposed at any viewing angle therebetween. When in the vertical mode, the screen can be looked down upon from above.

Television camera analog signals can be converted to digital signals which are directed to control each IPM. In the device of this invention the images desired to be displayed can be controlled by a device producing such a digital signal. Properly processed television broadcast images can be utilized in the device of this invention produced in one embodiment by multiple lens stereoscopic television cameras to provide image data to such IPM devices appropriate for all positions between points X and Y within the viewing chamber.

Figure 3:
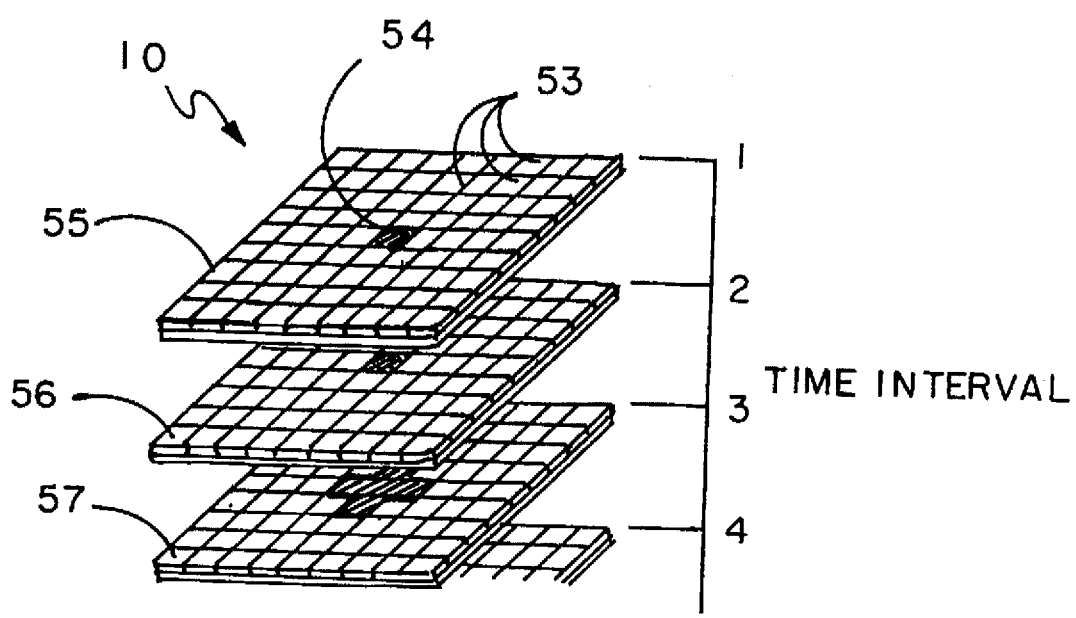
FIG. 3 illustrates a perspective view of a planar screen at multiple positions.
Figure 4:
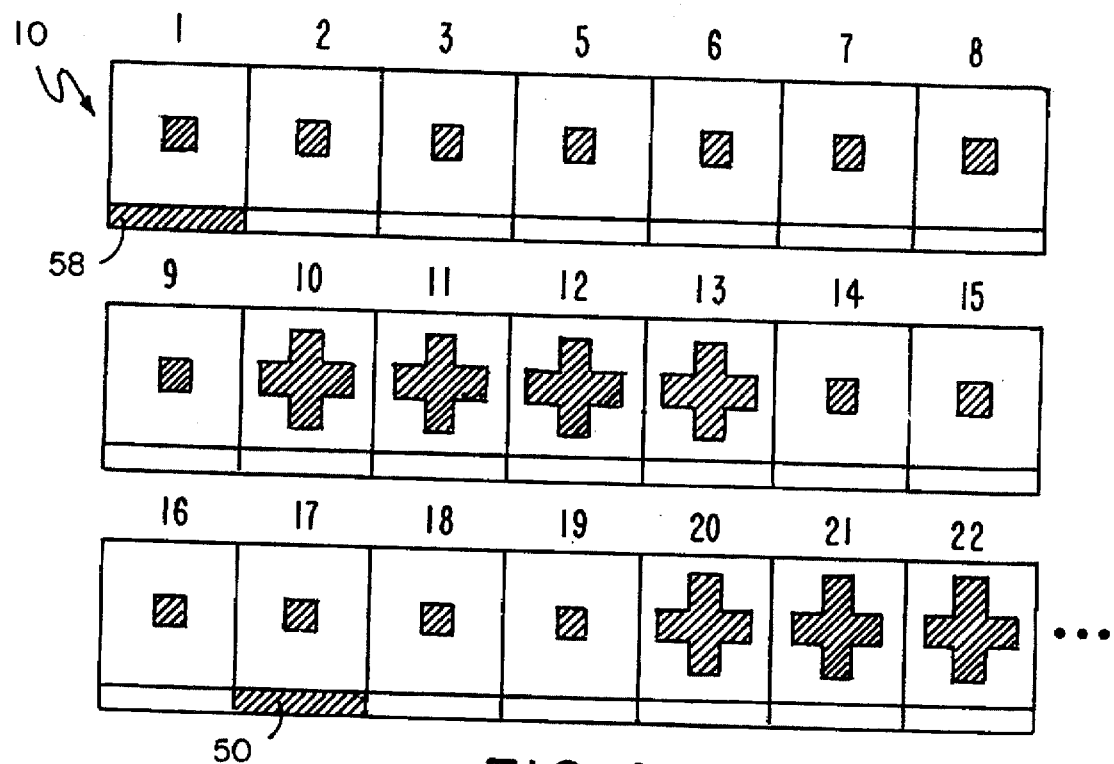
FIG. 4 illustrates a series of top planar views of a planar screen at different levels within the display chamber.
Figure 5:
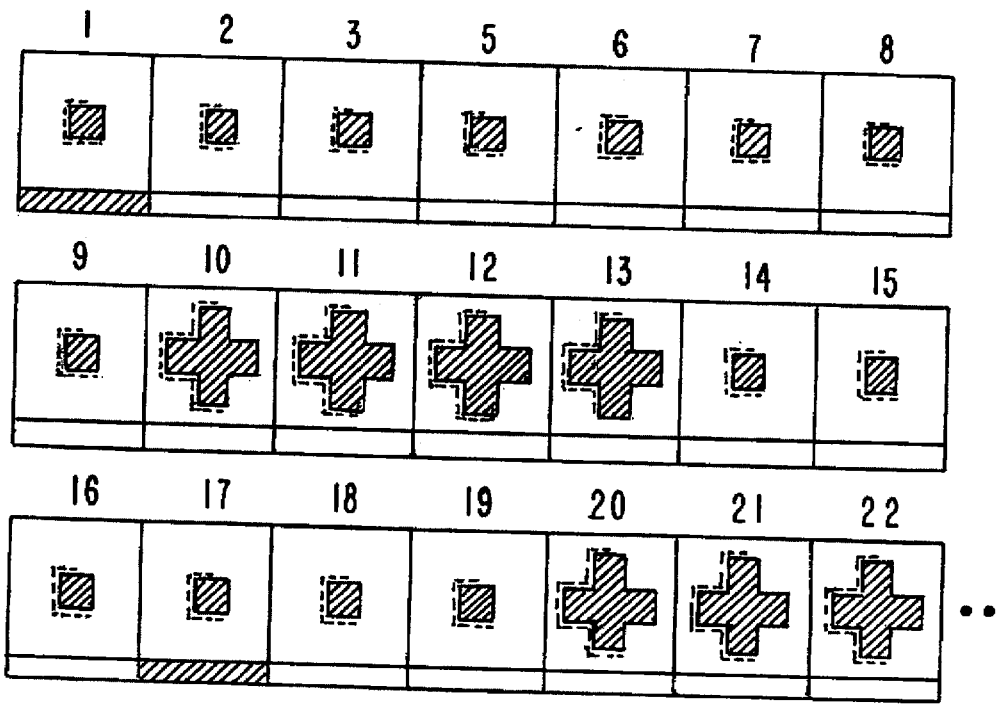
FIG. 5 illustrates the views of FIG. 4 with shading on a side of the images.
Figure 6:
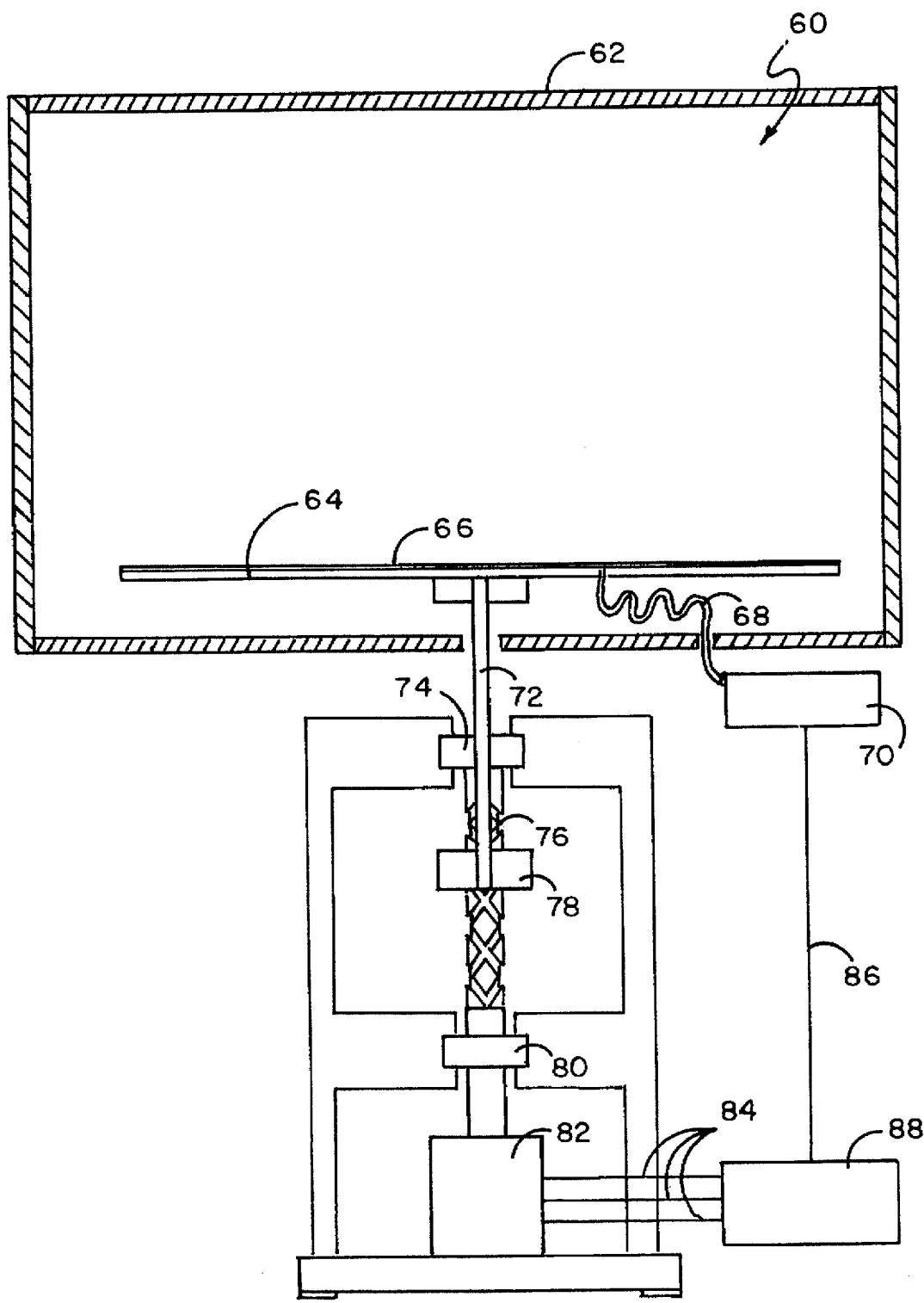
FIG. 6 illustrates a side view of an alternate embodiment of a flat planar screen device.

In one embodiment the drive system for a flat screen, as seen in FIGS. 1 and 6, can utilize a servo-type motor having a phase synchronization controller as described further below. The controlling signal of the servo motor can be generated by a computer program, such as an animation program. At the same time pixel information can be transmitted. For a single object representation the program would cycle repetitively. For example, if the object being displayed is to be a sphere, the first frame where front surface 12 is at an uppermost position would cause illumination of parts of the surface of the screen corresponding to the uppermost part of the sphere. As the screen moved lower within the chamber, the image thereon would enlarge to be a greater cross-section of the same sphere cut through a lower portion of the sphere. As the screen moved even lower, the illuminated portion thereon would be even a larger circle until the middle of the sphere was reached. Then at each position of the screen there would be circles of decreasing diameter as the screen moved to the bottom of the chamber and the bottom of the image of the sphere. More complex three-dimensional shapes could be displayed by sequencing cross-sections of pixel illumination other than that of a circle. It is important that the cycle of the moving flat screen be matched perfectly with the cross-sectional images being displayed on the screen as controlled by the computer program. FIG. 3 illustrates time interval positions of screen 10 wherein at first level 55 a center pixel 54 is illuminated out of a plurality of pixels 53. As the screen moves lower, through second level 56 to reach third level 57, more of the pixels are illuminated in the center of the screen. This phenomenon is illustrated further in FIG. 4 showing screen 10 at a plurality of levels designated 1–22, each succeeding one being lower than the next. An animation program can direct which pixels are illuminated on the surface of the screen. The illuminated pixels are seen darkened. A timing track 58 is seen at the bottom of Frame 1 and another timing track 50 is seen at the bottom of Frame 17. These timing tracks can be generated by the computer with its associated frame to send a signal to the servo drive controller of the motor to maintain its proper speed adjustment for the image being generated. One timing signal is sent, for example, with Frame 1 which is associated with the uppermost stroke limit, and later another timing signal 50 is sent when the screen reaches the position of Frame 17 which is the lower limit. Timing signals could be sent more often, even with every frame. This image displayed would show a cross apparently suspended in mid air near the center of the display chamber. When the system is used with an active matrix display which has the ability for individual pixel addressing, such as FEDs described above, a large number of different images can be created. In some cases it is helpful that an image contain some shading effect to help make the image stand out more clearly such as seen in the plurality of images in FIG. 5.

Other IPMs can be used in place of FEDs or LEDs. For example, in yet another embodiment, a plurality of independently controlled microlasers located on small chips can be utilized. In some further embodiments individual fiber optic strands from a bundle can each be directed to illuminate one of a plurality of translucent points on the display screen. Other equivalent light-producing small elements that can be independently controlled can also be utilized on the screen.

Display screen 10 in the embodiment shown in FIG. 1 is reciprocally moved rapidly back and forth between points X and Y within viewing chamber 16 on shaft 18 which shaft, for example, can be attached by arm 20 with an eccentric cam 22 on motor 24 simultaneously driving arm 20 and attached shaft 18 back and forth within viewing chamber 16. In one embodiment a video image is digitized by computer 26 and the signals directed through flexible lead 27 to display screen 10. The image displayed by the light-producing elements on the screen changes depending upon which light sources are directed to be illuminated and depending upon the position of the screen as it moves within the viewing chamber. Because of persistence of vision, an impression of an image is retained by the observer when the screen is in its farthest away position near point Y and in all intermediate positions to its closest position to the observer such that the image appears to be three-dimensional as the screen moves back and forth from point Y to point X and from point X to point Y. Different screen image patterns, moving or still, can be used, even those depicting real life images. Different colors can also be utilized. If an FED device is used, it can receive a television signal from appropriate circuitry to display a television image with many picture elements or pixels of display included within one FED device.

FIG. 6 illustrates an alternate embodiment of a drive system for a display screen 64 within chamber 60. In this embodiment screen 64 is driven up and down within chamber 60 on its central shaft 72 which is engaged to self-reversing screw 76 by screw follower 78. As motor 82 rotates, screw follower 78 moves reciprocally up and down on the rotating self-reversing screw 76. This action moves shaft 72 attached to screw follower 78 up and down. Self-reversing screw 76 can be rotatably held by bearings 74 and 80. Motor 82 can be a stepper motor whose rotation is controlled through electric lines 84 from stepper controller motor 88 which, in turn, is controlled by computer 70 which sends the screen position information along line 86 to stepper motor controller 88. Stepper motor controller then controls stepper motor 82 to rotate to position screen 64 at the desired level within chamber 60 such that screen 64 can be viewed through transparent side 62. Because of the relatively constant velocity of the self-reversing screw producing the oscillating motion of the screen, there is less deceleration and acceleration before and after the reversal of direction of screen 64 within chamber 60. A self-reversing screw made from a lubricious and wear-resistant material, such as a high-density polypropylene, can have a long service life. Animation programs that have been found suitable for producing output for the display include MacroMedia Director, Adobe Premier and Statavision (Third Edition). Computer 70 can deliver the display screen information to, for example, an FED matrix 66 along line 68 to provide the images on display screen 64.

Figure 2:
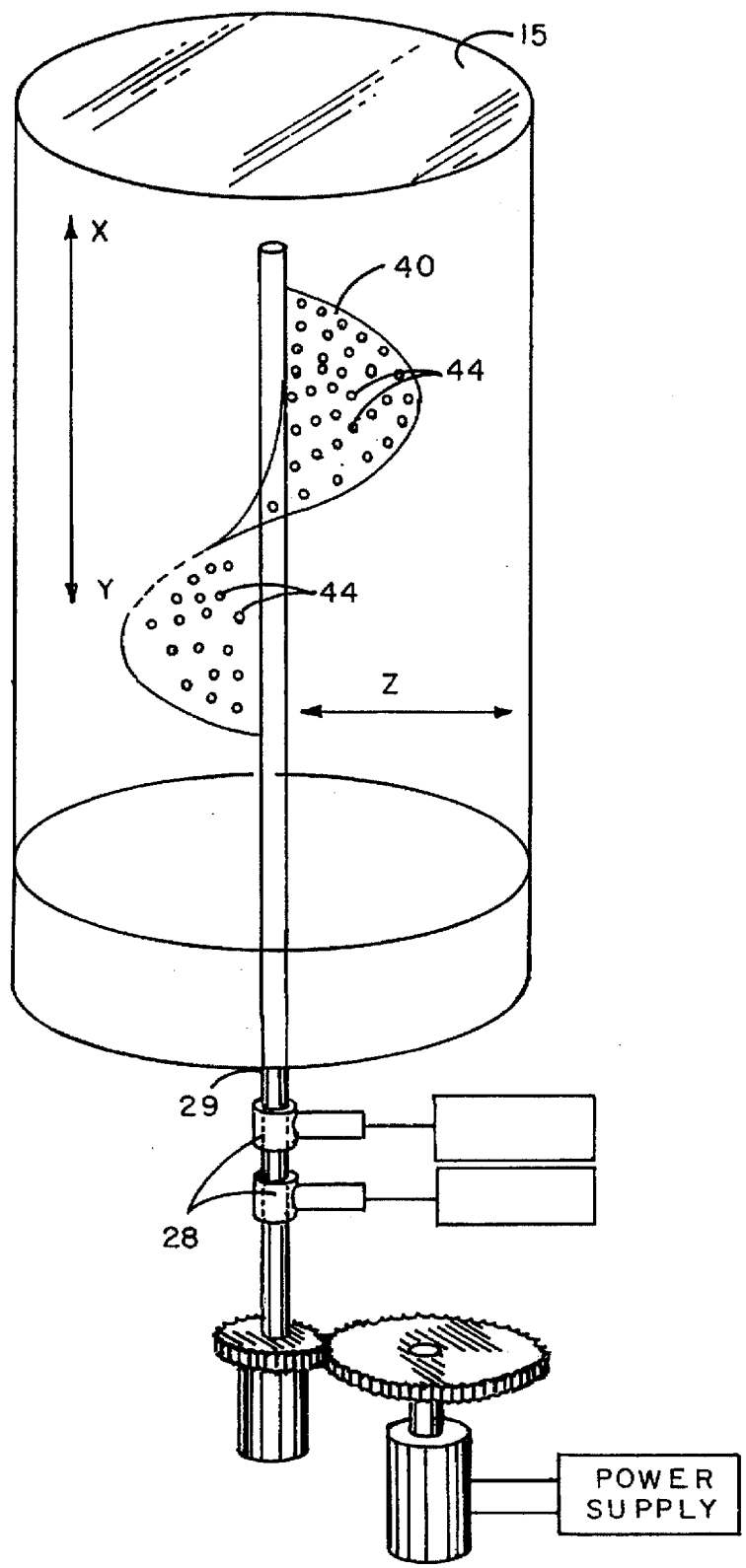
FIG. 2 illustrates a perspective view of another embodiment of the display device of this invention showing a spiral screen mounted on a shaft which screen is rapidly rotated.

In an alternate embodiment of this invention the screen can be formed in the shape of a spiral screen 40, as seen in FIG. 2, which screen is opaque and is viewed from the front within cylindrical chamber 42. Spiral screen 40 can have the same type of IPMs 44 thereon, as discussed above, such as used on flat screen 10 as seen in FIG. 1. Contact can be made through electrical lines 29 on the shaft, such line(s) running to, for example, an FED by a plurality of brushes 28 carrying the appropriate electric signal to each of such lines. As spiral screen 40 rotates, each IPM 44 on the spiral screen can be illuminated or not, as directed by a television signal or a computer to which each IPM can be interconnected, and images can be produced along the X-Y depth of spiral screen 40 as it rotates. Unlike flat screen 10 seen in FIG. 1, spiral screen 40 does not have to move back and forth within its cylindrical chamber 42 as it covers the same volume (X,Y,Z) of the chamber by merely rotating. Such rotatable spiral screen can be contoured by at least two radii drawn perpendicular from its axis of rotation where such radii are at a distance from one another along such axis. A screen surface can be defined by extending a screen surface along a plurality of such radii drawn at an angle to one another and spaced apart from one another along such axis in a continuing series, each at a greater angle from a first succeeding one and each higher than the next below, such radii forming the basis for the screen's spiral shape.

The spiral screen embodiment can utilize a similar servo drive to drive motor 82 in FIG. 6 for framing and anti-roll control. FED technology can be adapted to spiral screen topography by utilizing small, uniformly-shaped, repeating segments joined together until the full screen is constructed. Each repeating unit can be electrically connected to an underlying thin-film printed circuit to act as the active matrix to power each pixel on the spiral screen.

Although the present invention has been described with reference to particular embodiments, it will be apparent to those skilled in the art that variations and modifications can be substituted therefor without departing from the principles and spirit of the invention.

I claim:

1. A display device for producing a three-dimensional image, comprising:
    a viewing chamber having a front and a back defined respectively by point X and point Y, said viewing chamber having a depth defined as the distance between point X and point Y;
    a movable screen disposed within said chamber, said screen having a front surface and a back surface, said front surface of said screen facing said front of said viewing chamber, said screen movable back and forth in a cycle to levels between point X and point Y and between point Y and point X from a first static phase at point X through an acceleration phase to a constant velocity phase to a deceleration phase and to a second static phase at point Y with said cycle repeating from point Y to point X;
    means to form a plurality of images by the emission of light on said front surface of said movable screen, each at a different point between point X and point Y along said chamber depth; and
    means to rapidly move said screen reciprocally back and forth within said chamber wherein said plurality of images are viewable from the front of said screen where a three-dimensional image is visible.

2. The display device of claim 1 wherein said means to form a plurality of images further includes means to receive video information in a controlled timed sequence which receiving means gates such information to said means to form a plurality of images during said constant velocity phase.

3. The display device of claim 2 wherein said plurality of images is formed from a plurality of pixels.

4. The display device of claim 3 wherein each of said pixels is created by an IPM.

5. The display device of claim 4 wherein said IPM is an FED.

6. The display device of claim 4 wherein said means to form said image includes a computer directing each individual IPM to emit light in a selected array to create a desired image.

7. The display device of claim 6 wherein said computer further controls the level of said screen at the selected level of said screen at the selected depth for each image.

8. A method for displaying a three-dimensional real image to a viewer comprising the steps of:
    moving a planar screen having a surface back and forth within a viewing chamber having a viewing area;
    sequentially forming a plurality of images on said surface of said screen in sequence to the screen's position in said viewing chamber characterized by said image not being formed by projection methods but being produced at said screen's surface;
    viewing said screen by said viewer through a portion of said viewing chamber;
    forming a three-dimensional image in said viewing area within said viewing chamber by said screen's movement, said three-dimensional image visible to said viewer;
    minimizing the acceleration and deceleration of said screen as it changes directions of movement in said viewing chamber by interengaging said screen to a rotating self-reversing screw; and
    driving said screen back and forth by said self-reversing screw's continuous unidirectional rotation.

9. The method of claim 8 further including the step of:
    forming said plurality of images by positioning a plurality of IPMs on said surface of said screen, each contributing to form a portion of said image.

* * * * *